US012771136B2

(12) United States Patent
Daniel

(10) Patent No.: US 12,771,136 B2
(45) Date of Patent: Oct. 20, 2026

(54) ELECTRIC POWER TRANSMISSION SYSTEM, METHOD FOR TRANSMISSION OF ELECTRIC POWER AND PLUG-IN INVERTER

(71) Applicant: Toshiba International Corporation, Houston, TX (US)

(72) Inventor: Michael Daniel, Bryan, TX (US)

(73) Assignee: Toshiba International Corporation, Houston, TX (US)

( * ) Notice: Subject to any disclaimer, the term of this patent is extended or adjusted under 35 U.S.C. 154(b) by 796 days.

(21) Appl. No.: 17/975,070

(22) Filed: Oct. 27, 2022

(65) Prior Publication Data

US 2024/0146064 A1 May 2, 2024

(51) Int. Cl.

*H02J 3/32* (2026.01)
*H02J 3/38* (2006.01)
*H02J 101/24* (2026.01)
*H02J 101/28* (2026.01)

(52) U.S. Cl.

CPC ................ *H02J 3/32* (2013.01); *H02J 3/381* (2013.01); *H02J 2101/24* (2026.01); *H02J 2101/28* (2026.01)

(58) Field of Classification Search

None
See application file for complete search history.

(56) References Cited

U.S. PATENT DOCUMENTS 11,171,485 B1* 11/2021 Ramesh .................. H02S 10/12
2011/0204720 A1* 8/2011 Ruiz ..................... B60L 53/305 307/66
2020/0106385 A1* 4/2020 Wenzel ................... H02S 40/32
2020/0280188 A1* 9/2020 Paciura ................. H02J 7/1438
2021/0050728 A1* 2/2021 Brombach ................ H02J 3/32
2021/0122258 A1* 4/2021 Sham ........................ H02J 7/02
2022/0239251 A1* 7/2022 Headley .................. H02S 40/38
2022/0285946 A1* 9/2022 Falk .......................... H02J 3/16
2023/0259086 A1* 8/2023 Das ....................... H02J 7/0068 700/295
2024/0070945 A1* 2/2024 Chongfuangprinya ..................... G06T 11/26

* cited by examiner

*Primary Examiner* — Nathan L Laughlin
(74) *Attorney, Agent, or Firm* — Baker Botts L.L.P.

(57) ABSTRACT

The present disclosure provides an electric power transmission system. The system includes an electric power generator configured to generate an output electric power. The system includes a first inverter electrically coupled between the electric power generator and one or more load elements. The first inverter includes a first inverter controller. The system includes a second inverter configured to be electrically coupled to the first inverter and with an electric power grid. The second inverter includes a second inverter controller configured to receive at least a first portion of a total generated output electric power from the first inverter to the second inverter when the total generated output electric power is greater than a total required electric power. The second inverter controller is further configured to transmit, through the plug-in inverter, the received first portion of the total generated output electric power to the electric power grid.

20 Claims, 6 Drawing Sheets

ELECTRIC POWER TRANSMISSION SYSTEM, METHOD FOR TRANSMISSION OF ELECTRIC POWER AND PLUG-IN INVERTER

TECHNICAL FIELD

Embodiments of the present disclosure relate to transmission of electric power to an electric power grid, more particularly, to systems and methods for transmission of surplus electric power between an electric power generator and an electric power grid.

BACKGROUND

Many establishments, domestic or commercial, have been taking advantage of decreased costs of setting up renewable resource-based electric power generators, such as photovoltaic- or wind-based electric power generators to augment the electric power being consumed from a primary source, such as an electric power grid. In some cases, the output electric power from such electric power generators may be in excess of what is required by an establishment. An advantageous means of handling such an excess of electric power may be to transmit it to the electric power grid to reap corresponding economic benefits.

However, in order to transmit electric power to the electric power grid, an inverter may be required that is certified for operations, according to one or more regulatory standards. Existing inverters may not have such certifications and replacing existing inverters with certified inverters may be expensive and not feasible.

There is, therefore, a requirement in the art, for a means to economically, and safely transmit electric power to an electric power grid.

SUMMARY

Embodiments of the present disclosure relate to transmission of electric power to an electric power grid, more particularly, to systems and methods for transmission of surplus electric power between an electric power generator and an electric power grid.

In a first aspect, the present disclosure provides an electric power transmission system. The electric power transmission system includes an electric power generator configured to generate an output electric power. The electric power transmission system further includes a first inverter having first input terminals and first output terminals. The first input terminals are electrically coupled to the electric power generator. The first output terminals are electrically coupled to one or more load elements. The first inverter is configured to supply alternating current (AC) electric power to the one or more load elements. The first inverter includes a first inverter controller communicably coupled to the electric power generator and the one or more load elements. The electric power transmission system further includes a second inverter having second input terminals and second output terminals. The second input terminals are configured to be electrically coupled to the first output terminals of the first inverter. The second output terminals are configured to be electrically coupled to an electric power grid. The second inverter includes a second inverter controller communicably coupled to the first inverter controller. The second inverter controller is configured to receive, at the second inverter, at least a first portion of a total generated output electric power from the first inverter. The second inverter controller is further configured to transmit, through the second inverter, the received first portion of the total generated output electric power to the electric power grid.

In some embodiments, the first inverter controller is configured to determine the total generated output electric power from the electric power generator. The first inverter controller is further configured to determine a total required electric power based on a cumulative of respective electric power requirements of the one or more load elements. The first inverter controller is further configured divert at least the first portion of the total generated output electric power from the first inverter to the second inverter when the total generated output electric power is greater than the total required electric power.

In some embodiments, the second inverter is configured to be in an indirect electrical connection with the electric power generator via the first inventor.

In some embodiments, the second inverter has a lower electric power capacity than that of the first inverter.

In some embodiments, the second inverter controller is further configured to determine a cumulative output electric power transmitted from the second inverter to the electric power grid during a predetermined period of time.

In some embodiments, the electric power transmission further includes a power storage device configured to be electrically coupled to a battery port of the first inverter. The second input terminals of the second inverter are configured to be electrically coupled to the first output terminals of the first inverter further through the power storage device.

In some embodiments, the electric power generator is a renewable electric power generator configured to generate a direct current (DC) electric power, and wherein the electric power generator is at least one of photovoltaic-based, and wind-based electric power generation sources.

In some embodiments, the second inverter is a plug-in inverter.

In a second aspect, the present disclosure provides a method for transmission of electric power. The method includes receiving, by a second inverter controller, at a second inverter, at least a first portion of a total generated output electric power from a first inverter. The first inverter has first input terminals and first output terminals. The first input terminals are electrically coupled to an electric power generator configured to generate an output electric power. The first output terminals are electrically coupled to the one or more load elements. The first inverter is configured to supply alternating current (AC) electric power to the one or more load elements. The second inverter has second input terminals and second output terminals. The second input terminals are electrically coupled to the first output terminals of the first inverter and the second output terminals are electrically coupled to an electric power grid. The method further includes transmitting, by the second inverter controller, through the second inverter, the first portion of the total generated output electric power to the electric power grid.

In some embodiments, the method further includes determining, by a first inverter controller, the total generated output electric power of the electric power generator. The first inverter includes the first inverter controller. The first inverter controller is communicably coupled to the electric power generator, the one or more load elements, and the second inverter controller. The method further includes determining, by the first inverter controller, a total required electric power based on a cumulative of respective electric power requirements of one or more load elements. The method further includes diverting, by the first inverter controller, at least the first portion of the total generated output electric power from the first inverter to the second inverter when the total generated output electric power is greater than the total required electric power.

In some embodiments, the method further includes providing a power storage device configured to be electrically coupled to a battery port of the first inverter. The method further includes electrically coupling the second input terminals of the second inverter to the first output terminals of the first inverter through the power storage device.

In some embodiments, the method further includes determining, by the second inverter controller, a cumulative output electric power transmitted from the second inverter to the electric power grid during a predetermined period of time.

In some embodiments, the method further includes indirectly electrically connecting the second inverter to the electric power generator via the first inverter.

In a third aspect, the present disclosure provides a plug-in inverter configured to be electrically coupled to a primary inverter of an electric power transmission system. The primary inverter has first input terminals and first output terminals. The first input terminals are electrically coupled to the electric power generator and the first output terminals are electrically coupled to the one or more load elements. The first inverter is configured to supply alternating current (AC) electric power to the one or more load elements. The primary inverter includes a first inverter controller communicably coupled to the electric power generator and the one or more load elements. The plug-in inverter has second input terminals and second output terminals. The second input terminals are electrically coupled to the first output terminals of the first inverter and the second output terminals are electrically coupled to an electric power grid. The plug-in inverter includes a second inverter controller communicably coupled to the first inverter controller and configured to receive, at the plug-in inverter, at least a first portion of a total generated output electric power from the primary inverter. The second inverter controller is further configured to transmit, through the plug-in inverter, the received first portion of the total generated output electric power to the electric power grid.

In some embodiments, the first inverter controller is configured to determine the total generated output electric power from the electric power generator. The first inverter controller is further configured to determine a total required electric power based on a cumulative of respective electric power requirements of the one or more load elements. The first inverter controller is further configured to divert at least the first portion of the total generated output electric power from the first inverter to the second inverter when the total generated output electric power is greater than the total required electric power.

In some embodiments, the plug-in inverter is configured to be in an indirect electrical connection with the electric power generator via the primary inventor.

In some embodiments, the plug-in inverter has a lower electric power capacity than that of the primary inverter.

In some embodiments, the second inverter controller is further configured to determine a cumulative output electric power transmitted from the plug-in inverter to the electric power grid during a predetermined period of time.

In some embodiments, the electric power transmission system further includes a power storage device configured to be electrically coupled to a battery port of the first inverter. The second input terminals of the second inverter are configured to be electrically coupled to the first output terminals of the first inverter further through the power storage device.

In some embodiments, the electric power generator is a renewable electric power generator configured to generate a direct current (DC) electric power, and wherein the electric power generator is at least one of photovoltaic-based, and wind-based electric power generation sources.

BRIEF DESCRIPTION OF THE DRAWINGS

For a more complete understanding of the present disclosure and its features and advantages, reference is made to the following description, taken in conjunction with the accompanying drawings, in which.

DETAILED DESCRIPTION

Illustrative embodiments of the present disclosure are described in detail herein. In the interest of clarity, not all features of the actual implementation are described in this specification. It will of course be appreciated that in the development of any such embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. Furthermore, in no way should the following examples be read to limit or define the scope of the disclosure.

Figure 1:
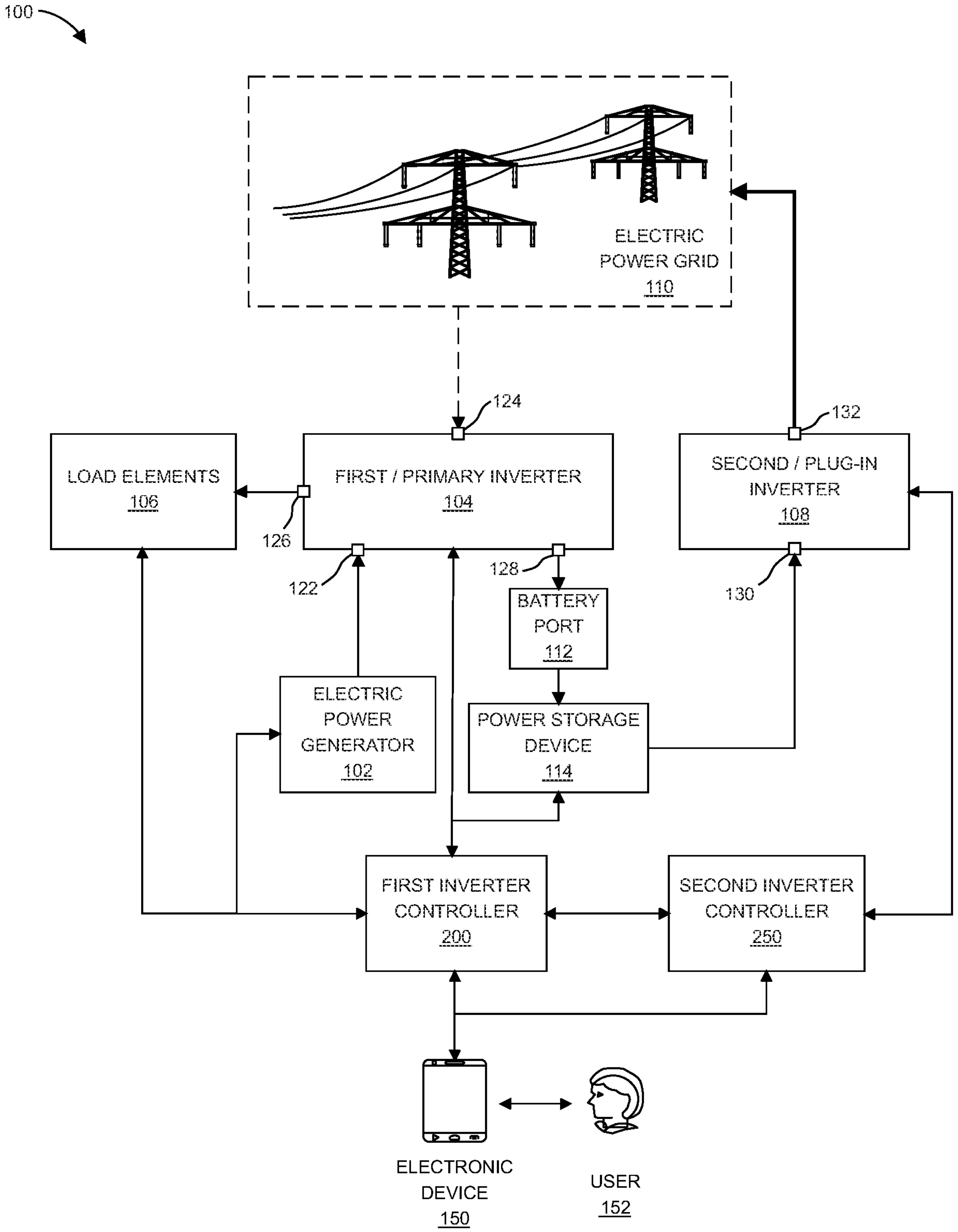
FIG. 1 illustrates an electric power transmission system topology, in accordance with an embodiment of the present disclosure.

FIG. 1 illustrates an electric power transmission system 100 topology, in accordance with an embodiment of the present disclosure. The electric power transmission system 100 may, herein, interchangeably be referred to as "the system 100". The system 100 may be implemented at any location, or at any level where there is electric power generation and an electric power grid. In one example, the system 100 may be implemented at a domestic level, where a house or a farm may consume electric power from an electric power grid, while also having a capacity to generate electric power through other means, such as through renewable resources, or through other fuel-based sources. In another example, the system 100 may similarly be implemented at an industrial or commercial level. In summary, the system 100 may be implemented where any entity consuming electric power generated from an electric power generator may wish to inject a surplus generated electric power to an electric power grid.

The system 100 includes an electric power generator 102 configured to generate an output electric power. In some embodiments, the electric power generator 102 may be a source for intermittent electric power generation. In such embodiments, the output electric power generated may be used to augment a primary source of electric power received at the system 100. In some instances, the electric power generator 102 may have a capacity to generate the output electric power only under certain conditions, such as during periods of suitable sunlight, suitable wind conditions, etc. In some embodiments, the electric power generator 102 may be a renewable energy-based electric power generator. For example, the electric power generator 102 may be a photovoltaic-based electric power generator, such as a set of solar panels. In another example, the electric power generator 102 may be a wind-based electric power generator, such as a set of wind turbines. In some examples, the electric power generator 102 may be of other types, such as geo-thermal-bases, thermal-based, water current-based, or water potential-based electric power generators. However, in some other examples, the electric power generator 102 may be fuel-based electric power generators, such as diesel generators.

The system 100 further includes a first inverter 104 having first input terminals 122, 124, and first output terminals 126, 128. In the illustrated embodiments of FIG. 1, the first inverter 104 includes two first input terminals 122, 124, and two first output terminals 126, 128. However, it may be appreciated that, in some embodiments, the two first input terminals 122, 124 may structurally correspond to one input terminal configured on the first inverter 104. Similarly, it may be appreciated that, in some embodiments, the two first output terminals 126, 128 may structurally correspond to one output terminal configured on the first inverter 104.

The first input terminals 122 are electrically coupled to the electric power generator 102. The first output terminals 126 are electrically coupled to one or more load elements 106.

Typically, the electric power generator 102 is configured to generate the output electric power as a direct current (DC) electric power. However, the one or more load elements 106 may be configured to preferentially operate on an alternating current (AC) electric power. The first inverter 104 is therefore, further configured to receive the output electric power from the electric power generator 102, convert the received DC electric power to an AC electric power, and supply the AC electric power to the one or more load elements 106. Thus, in some cases, the first inverter 104 may function as a DC to AC converter. In some embodiments, when the electric power generator 102 operates intermittently, the first inverter 104 may also be electrically coupled to a primary electric power source (such as an electric power grid 110) via the first input terminals 124, to receive electric power and transmit the received electric power to the one or more load elements 106.

The first inverter 104 further includes a first inverter controller 200 communicably coupled to the electric power generator 102 and the one or more load elements 106. The first inverter controller 200 is configured to operate the first inverter 104, which may include, without limitations, regulating electric power supply between the electric power generator 102, the one or more load elements 106 and the electric power grid 110. The first inverter controller 200 may further be configured to operate the first inverter 104 to convert a DC electric power to an AC electric power.

The system 100 further includes a second inverter 108 having a second input terminal 130 and a second output terminal 132. The second input terminal 130 is configured to be electrically coupled to first output terminals 128 of the first inverter 104. In some embodiments, the second input terminal 130 of the second inverter 108 may be configured to be electrically coupled to the first output terminals 128 of the first inverter 104 through a battery port 112 of the first inverter 104. The second output terminal 132 is configured to be electrically coupled to the electric power grid 110. The second inverter 108 may be configured for injection of electric power to the electric power grid 110. Specifically, the second inverter 108 may be configured to inject any surplus electric power available from the electric power generator 102 to the electric power grid 110.

The second inverter 108 further includes a second inverter controller 250 communicably coupled to the first inverter controller 200. The second inverter controller 250 is configured to operate the second inverter 108, which may include, without limitations, receiving a portion of electric power from the first inverter 104 to the second inverter 108, and transmitting the received portion of the electric power from the second inverter 108 to the electric power grid 110.

In some embodiments, the system 100 may include a computing device (not shown in figure). The computing device may include one or more controllers to operate different components of the system 100. The computing device may include the first inverter and second inverter controllers 200, 250. It may be appreciated that inclusion of one or more controllers or of one or more computing device configured to perform functions of the one or more controllers are within the scope of the present disclosure.

The supply of electric power to the electric power grid may be monetizable, and therefore, advantageous. However, surplus electric power may not be available at all times, or in great quantities, particularly when the electric power generator 102 is renewable resource-based. As a result, the second inverter 108 may have a lower electric power capacity than that of the first inverter 104, as the second inverter 108 may be required to transmit a low quantum of electric power to the electric power grid 110. Further, the second inverter 108 may not require electronic components to handle electric power directly generated by the electric power generator 102, such as components to convert DC electric power to AC electric power. As a result, the second inverter 108 may be smaller and more economical than the first inverter 104. Further, in such cases, the second inverter 108 may be indirectly electrically connected to the electric power generator 102 via the first inverter 104 and may receive the surplus electric power from the first inverter 104.

In some embodiments, the second inverter 108 is certified to safely transmit electric power to the electric power grid 110. In some embodiments, the second inverter 108 may be certified according to at least one of UL 1741 standard and IEEE 1547 standard. In some embodiments, the first inverter 104 may not be certified according to such standards.

In some embodiments, the second inverter 108 may be a plug-in inverter. In other words, the second inverter 108 may be a separate or discrete component that may be introduced in an existing system that includes the first inverter 104.

The first inverter 104, herein, may be interchangeable referred to as "a primary inverter 104". Thus, the system 100 further includes the primary inverter 104 electrically coupled between the electric power generator 102 and the one or more load elements 106.

The second inverter 108, herein, may be interchangeable referred to as "a plug-in inverter 108". Thus, the system 100 further includes the plug-in inverter 108 electrically coupled to the primary inverter 104 and to the electric power grid 110.

The system 100 further includes one or more electronic device, such as an electronic device 150. The electronic device 150 may be operable by or associated with a user of the system 100, such as a user 152. The electronic device 150 may be communicably coupled to any one or both of the first inverter and second inverter controllers 200, 250 through wired, or wireless means. The electronic device 150 may be any electrical, electronic, electromechanical, and computing device. In some embodiments, the electronic device 150 may include audio-visual devices, such as display screens, LED lighting displays, speakers, etc. The electronic device 150 may include, without limitations, a mobile device, a smart phone, a Personal Digital Assistant (PDA), a tablet computer, a phablet computer, a wearable device, a Virtual Reality/Augment Reality (VR/AR) device, a laptop, a desktop, and the like.

In some embodiments, the electronic device 150 may be configured to receive data from or transmit data to any one or both of the first inverter and second inverter controllers 200, 250. For example, the electronic device 150 may be configured to display information related to transmission of electric power to the electric power grid 110. In another example, the electronic device 150 may be configured to issue instruction to the second inverter controller 250 to regulate a quantity of electric power to be transmitted to the electric power grid 110.

In some embodiments, the system 100 may further include a power storage device 114 (such as a battery bank) electrically coupled to the first inverter 104, and communicably coupled to the first inverter and second inverter controllers 200, 250. The power storage device 114 may be configured to selectively store and discharge electric power. The power storage device 114 may store any electric power generated. The power storage device may discharge to release the electric power stored. In some embodiments, the power storage device 114 may be electrically coupled to the first inverter 104 via the battery port 112 of the first inverter 104. Further, the power storage device 114 may store electric power as a DC electric power. The first inverter 104 may further be configured to convert a received AC electric power to a DC electric power before transmitting the electric power to the power storage device 114. Thus, in some cases, the first inverter 104 may function as an AC to DC converter. The first inverter controller 200 may be configured to operate the first inverter 104 to convert the AC electric power to the DC electric power.

In some embodiments, the second inverter 108 may be electrically coupled to the first inverter 104 via the power storage device 114. However, in some embodiments, the power storage device 114 may be electrically coupled to the first inverter 104 through another battery port (not shown in figure) of the first inverter 104.

Figure 2A:
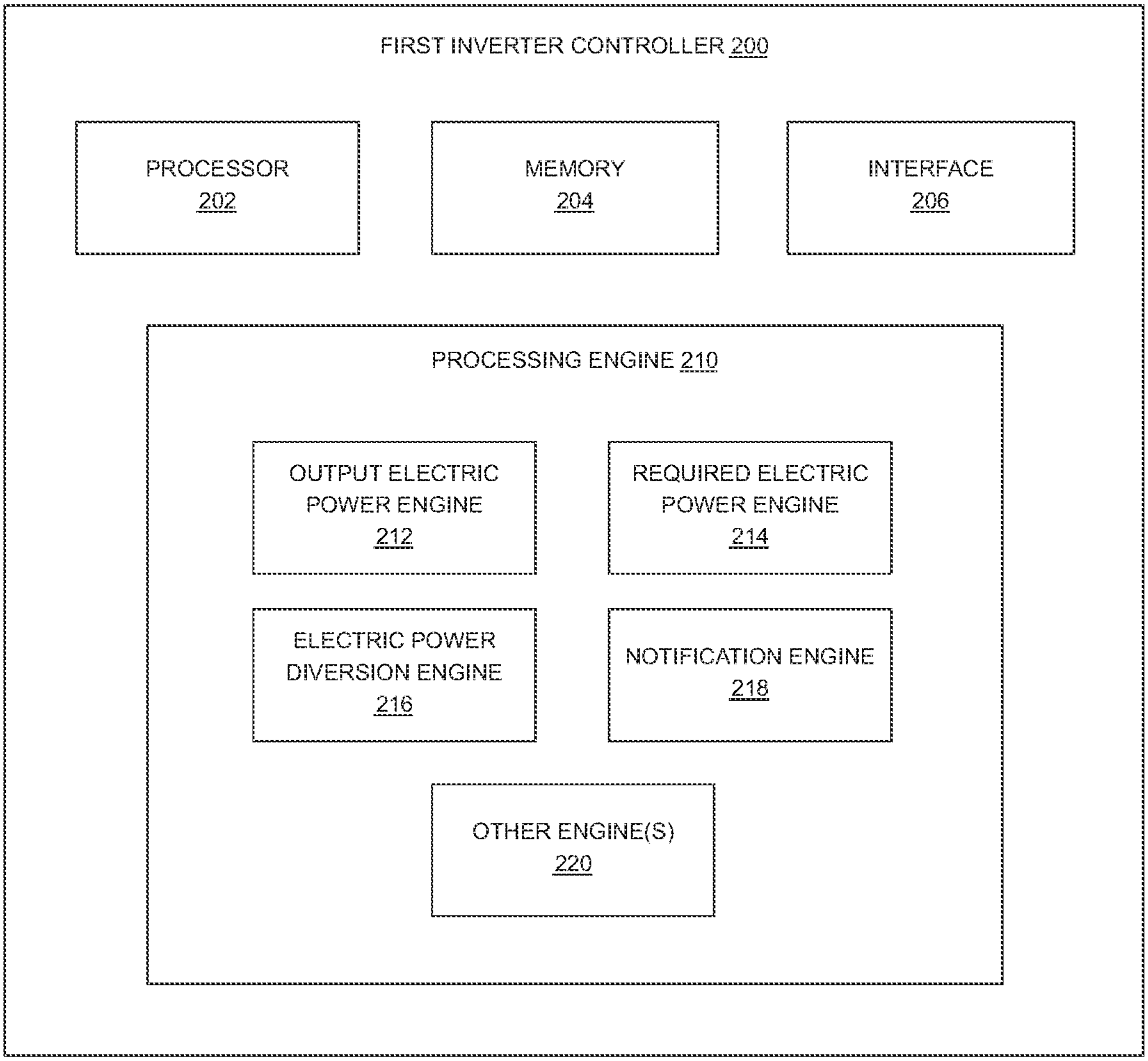
FIG. 2A illustrates a schematic block diagram of a first inverter controller of a first inverter of the electric power transmission system topology of FIG. 1, in accordance with an embodiment of the present disclosure.

FIG. 2A illustrates a schematic block diagram of the first inverter controller 200 of the first inverter 104, in accordance with an embodiment of the present disclosure. Referring now to FIGS. 1 and 2A, the first inverter controller 200 includes a processor 202, and a memory 204 communicably coupled to the processor 202. The memory 204 may store instructions executable by the processor 202 to operate the first inverter 104. The first inverter controller 200 further includes an interface 206. The interface 206 may include a variety of interfaces, for example, interfaces for data input and output devices, referred to as I/O devices, storage devices, and the like. The interface 206 may also provide a communication pathway for one or more components of the first inverter controller 200.

In some embodiments, the first inverter controller 200 includes a processing engine 210. The processing engine 210 may be implemented as a combination of hardware and programming (for example, programmable instructions) to implement one or more functionalities of the first inverter controller 200. In some examples, the processing engine 210 may be implemented by electronic circuitry.

The processing engine 210 includes an output electric power engine 212, a required electric power engine 214, an electric power diversion engine 216, a notification engine 218, and other engine(s) 220. The other engine(s) 220 may include engines configured to perform one or more ancillary functions associated with the processing engine 210.

In some embodiments, the output electric power engine 212 is configured to determine a total generated output electric power from the electric power generator 102. The total generated output electric power may be determined based on data signals received by the output electric power engine 212 from the electric power generator 102. The total generated output electric power may be determined over a predetermined period of time, for example, over every hour, over every six hours, over each day, etc.

In some embodiments, the required electric power engine 214 is configured to determine a total required electric power required for operating the one or more load elements 106. The total required electric power may be based on a cumulative of electric power required by individual load elements for their operation. The total required electric power may be determined for the predetermined period of time.

In some embodiments, the electric power diversion engine 216 is configured to operate the first inverter 104 to allow at least a first portion of the total generated output electric power to be diverted from the first inverter 104 to the second inverter 108 when the total generated output electric power is greater than the total required electric power. In some embodiments, the electric power diversion engine 216 may set a minimum difference between the total generated output electric power and the total required electric power that may be required for the electric power diversion engine 216 to allow the diversion of the first portion of the electric power from the first inverter 104 to the second inverter 108. The electric power diversion engine 216 may set a value for the minimum difference based on input from the user 152 via the electronic device 150. In some embodiments, the electric power diversion engine 216 may be configured to regulate a quantum of the first portion of the total generated output electric power to be diverted to the second inverter 108 from the first inverter 104. The electric power diversion engine 216 may regulate the quantum of electric power based on input from the user 152 via the electronic device 150.

In some embodiments, the electric power diversion engine 216 may be further configured to divert the first portion of total generated output electric power to be diverted to the battery port 112 of the first inverter 104, thereby causing an increase in voltage of the battery port 112.

In embodiments where the first inverter 104 is electrically coupled to the first the power storage device 114, the first inverter 104 may transmit the first portion of the total generated output electric power to the power storage device 114.

In some embodiments, the notification engine 218 may be configured to operate the electronic device 150 to display information related to operation of the system 100. Some examples of the information include, without limitation, the total generated output electric power, the total required electric power, the value of the minimum difference, and the quantum of the first portion of the electric power for diversions from the first inverter 104 to the second inverter 108.

Figure 2B:
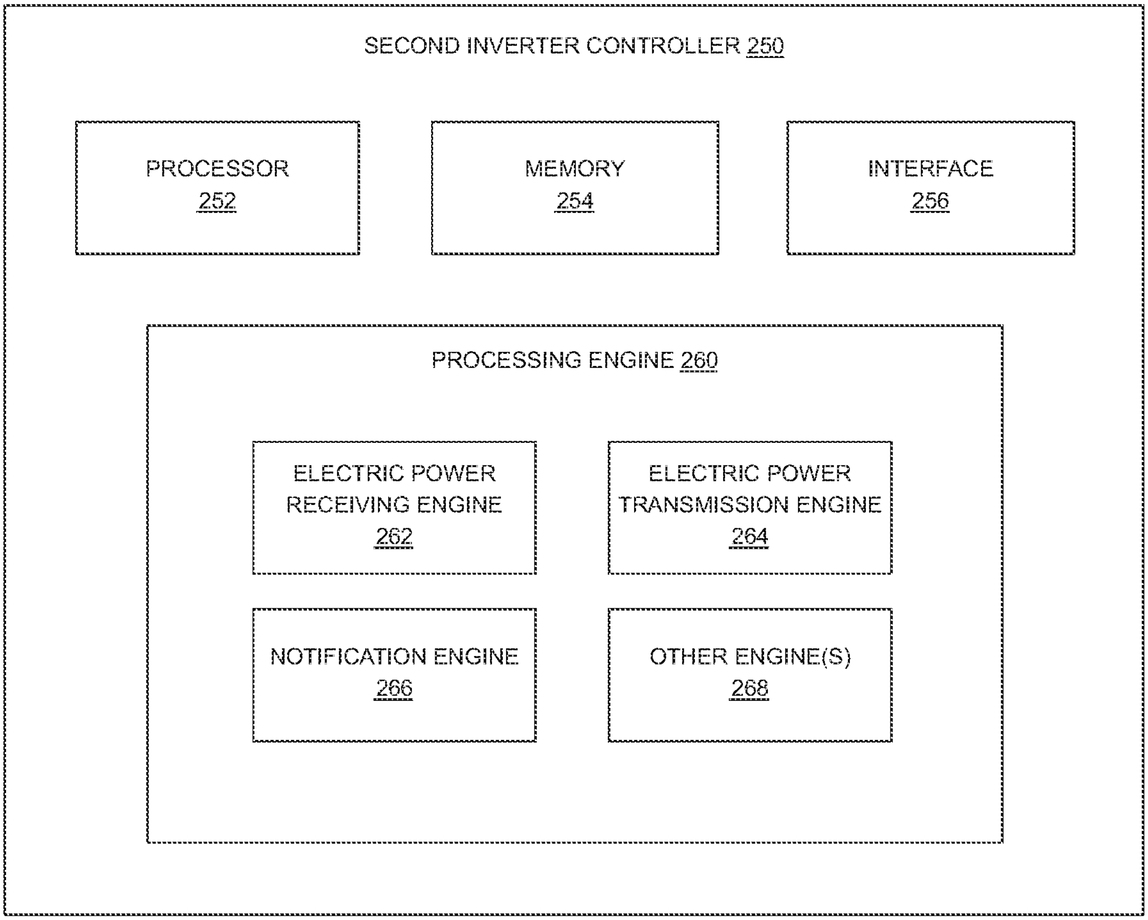
FIG. 2B illustrates a schematic block diagram of a second inverter controller of a second inverter of the electric power transmission system topology of FIG. 1, in accordance with an embodiment of the present disclosure.

FIG. 2B illustrates a schematic block diagram of the second inverter controller 250 of the second inverter 108, in accordance with an embodiment of the present disclosure. Referring now to FIGS. 1, 2A and 2B, the second inverter controller 250 includes a processor 252, and a memory 254 communicably coupled to the processor 252. The memory 254 may store instructions executable by the processor 252 to operate the second inverter 108. The second inverter controller 250 further includes an interface 256. The interface 256 may include a variety of interfaces, for example, interfaces for data input and output devices, referred to as I/O devices, storage devices, and the like. The interface 256 may also provide a communication pathway for one or more components of the second inverter controller 250.

In some embodiments, the second inverter controller 250 includes a processing engine 260. The processing engine 260 may be implemented as a combination of hardware and programming (for example, programmable instructions) to implement one or more functionalities of the second inverter controller 250. In some examples, the processing engine 260 may be implemented by electronic circuitry.

The processing engine 260 includes an electric power receiving engine 262, an electric power transmission engine 264, a notification engine 266, and other engine(s) 268. The other engine(s) 268 may include engines configured to perform one or more ancillary functions associated with the processing engine 260.

In some embodiments, the electric power receiving engine 262 is configured to receive the first portion of the total generated output electric power from the first inverter 104. The electric power receiving engine 262 may be configured to operate the second inverter 108 to receive the electric power based on a signal received from the first inverter controller 200 indicating that the voltage of the battery port 112 of the first inverter 104 has increased. This may indicate that there is excess or surplus electric power to be diverted to the second inverter 108 for the purposes of transmitting the surplus electric power to the electric power grid 110.

In embodiments where the second inverter 108 is electrically coupled to the first inverter 104 via the power storage device 114, the second inverter 108 may receive the first portion of the total generated output electric power via the power storage device 114. In such cases, the power storage device 114 may further serve to stabilize a voltage of the first portion of the total generated output electric power, thereby smoothening the transfer of electric power from the first inverter 104 to the second inverter 108.

In some embodiments, the electric power transmission engine 264 is configured to operate the second inverter 108 to transmit the received electric power from the second inverter 108 to the electric power grid 110. The electric power transmission engine 264 may further be configured to determine a cumulative quantum of electric power transmitted by the second inverter 108 to the electric power grid 110. In some embodiments, the cumulative quantum of electric power may be determined over the predetermined period of time.

In some embodiments, the notification engine 266 may be configured to operate the electronic device 150 to display information related to operation of the system 100. Some examples of the information include, without limitation, the cumulative quantum of electric power transmitted from the second inverter 108 to the electric power grid 110.

Thus, the system 100 facilitates surplus electric power generated to be transmitted to the electric power grid 110, which may be monetized. Further, the second inverter 108 may be compact, simple, and economic, and may enable the transmission of the surplus electric power to the electric power grid 110 without a requirement for a new inverter to replace an existing first inverter 104. Further, the second inverter 108 is certified to safely transmit electric power to the electric power grid 110.

Figure 3A:
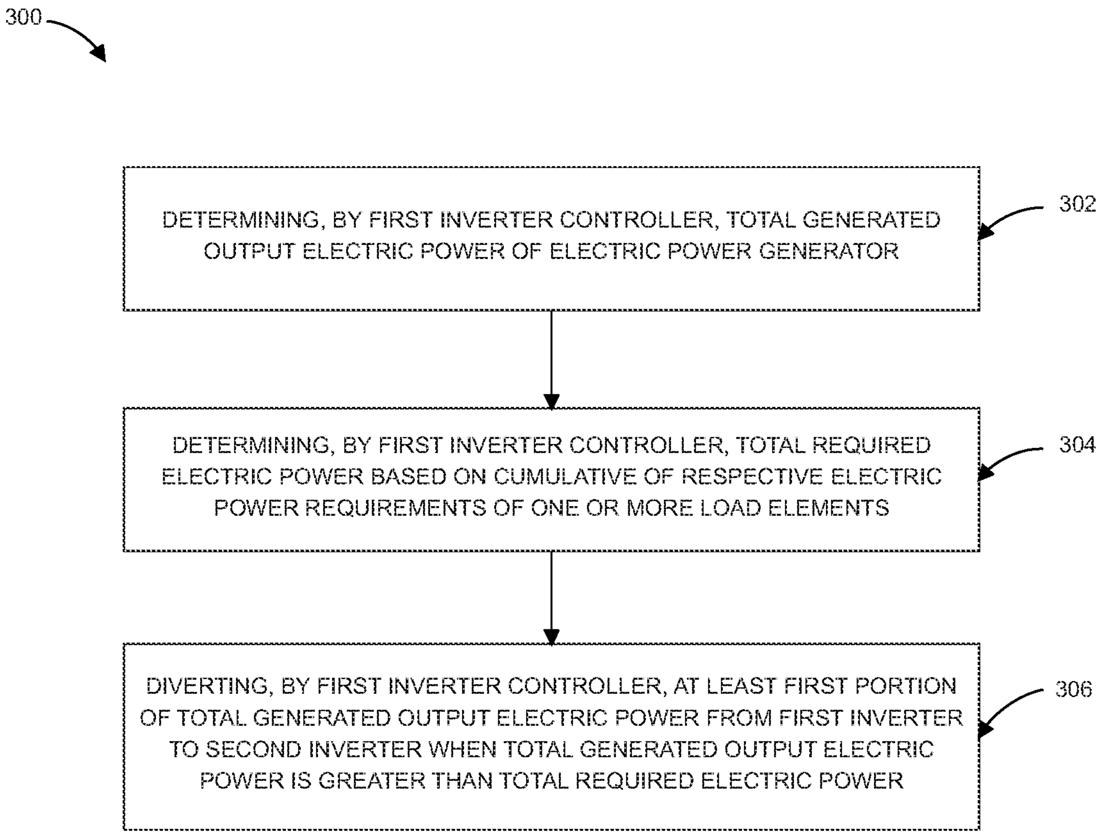
FIG. 3A illustrates a schematic flow diagram of a method for transmission of electric power implemented by the first inverter controller of FIG. 2A, in accordance with an embodiment of the present disclosure.

FIG. 3A illustrates a schematic flow diagram of a method 300 for transmission of electric power implemented by the first inverter controller 200, in accordance with an embodiment of the present disclosure. Referring now to FIGS. 1, 2A and 3A, at step 302, the method 300 includes determining, by the first inverter controller 200, the total generated output electric power of an electric power generator 102. At step 304, the method 300 includes determining, by the first inverter controller 200, the total required electric power based on the cumulative of respective electric power requirements of one or more load elements 106. At step 306, the method 300 further includes, diverting, by the first inverter controller 200, the first portion of the total generated output electric power from the first inverter 104 to the second inverter 108 when the total generated output electric power is greater than the total required electric power.

In some embodiments, the method 300 further includes providing the power storage device 114 configured to be electrically coupled to the battery port 112 of the first inverter 104.

Figure 3B:
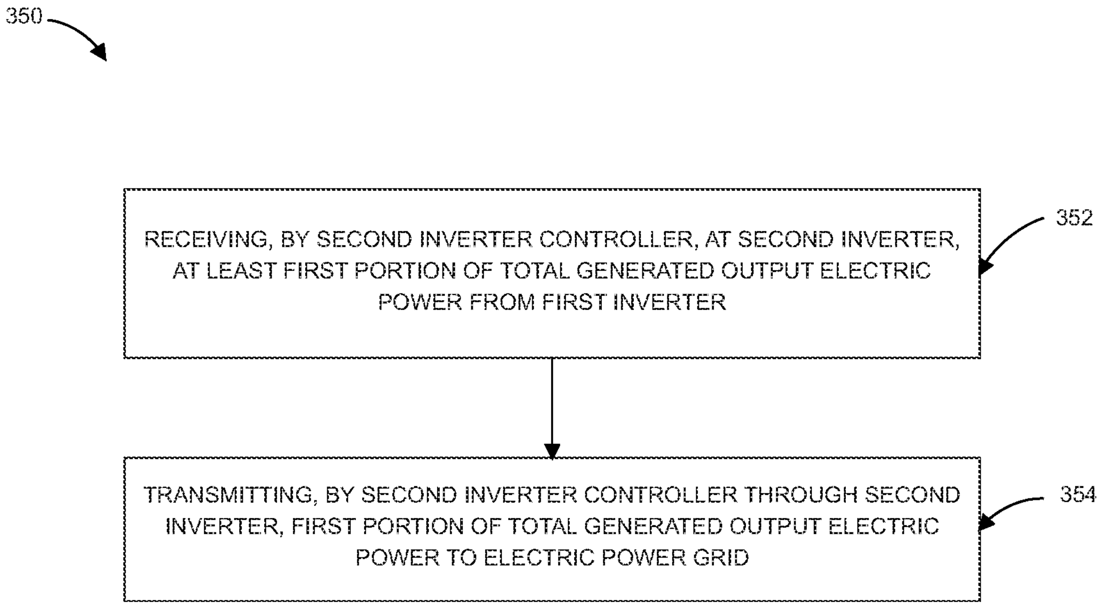
FIG. 3B illustrates a schematic flow diagram of a method for transmission of electric power implemented by the second inverter controller of FIG. 2B, in accordance with an embodiment of the present disclosure.

FIG. 3B illustrates a schematic flow diagram of a method 350 for transmission of electric power implemented by the second inverter controller 250, in accordance with an embodiment of the present disclosure. Referring now to FIGS. 1 to 3B, at step 352, the method 350 includes receiving, by the second inverter controller 250, at the second inverter 108, at least the first portion of the total generated output electric power. At step 354, the method 350 further includes transmitting, by the second inverter controller 250, through the second inverter 108, the first portion of the total generated output electric power to the electric power grid 110.

In some embodiments, the method 350 further includes determining, by the second inverter controller 250, the cumulative output electric power transmitted from the second inverter 108 to the electric power grid 110 during the predetermined period of time.

In some embodiments, the method 350 further includes indirectly electrically connecting the second inverter 108 with the electric power generator 102 via the first inverter 104.

In some embodiments, the method 350 further includes electrically coupling the second input terminals of the second inverter 108 to the first output terminals of the first inverter 104 through the power storage device 114.

Figure 4:
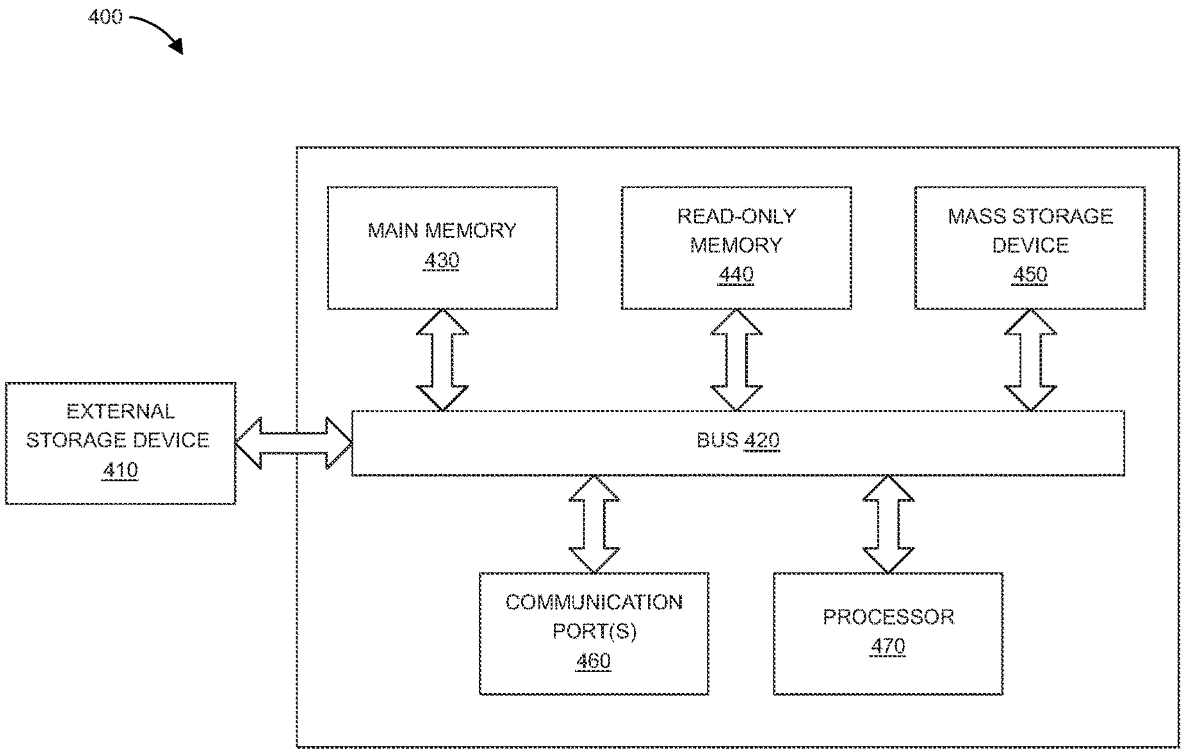
FIG. 4 illustrates a schematic block diagram of a hardware system for implementing the computing device of FIG. 1, according to an embodiment of the present disclosure.

FIG. 4 illustrates an exemplary schematic block diagram of a hardware platform for implementation of any or both of the first inverter and second inverter controllers 200, 250 (shown in FIGS. 1 to 2B). As shown in FIG. 4, a computer system 400 can include an external storage device 410, a bus 420, a main memory 430, a read only memory 440, a mass storage device 450, communication port 460, and a processor 470. A person skilled in the art will appreciate that the computer system may include more than one processor and communication ports. Examples of processor 470 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 470 may include various modules associated with embodiments of the present invention. Communication port 460 can be any of an RS-232 port for use with a modem-based dialup connection, a 10/100 Ethernet port, a Gigabit or 10 Gigabit port using copper or fiber, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 420 communicatively couples processor(s) 470 with the other memory, storage, and communication blocks. Bus 420 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g., a display, keyboard, and a cursor control device, may also be coupled to bus 420 to support direct operator interaction with a computer system. Other operator and administrative interfaces can be provided through network connections connected through communication port 460. The external storage device 410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Although the disclosure and its advantages have been described in detail, it should be understood that various changes, substitutions and alterations can be made herein without departing from the spirit and scope of the disclosure as defined by the following claim.

The invention claimed is:

1. An electric power transmission system, comprising:

an electric power generator configured to generate an output electric power;

a first inverter having first input terminals and first output terminals, wherein the first input terminals are electrically coupled to the electric power generator and the first output terminals are electrically coupled to one or more load elements, the first inverter configured to supply alternating current (AC) electric power to the one or more load elements, wherein the first inverter comprises a first inverter controller communicably coupled to the electric power generator and the one or more load elements, the first inverter controller comprising an electric power diversion engine configured to:

determine a minimum difference between a total generated output electric power from the electric power generator and a total required electric power that is based on a cumulative of respective electric power requirements of the one or more load elements; and divert, at least a first portion of the total generated output electric power, based on the minimum difference;

a second inverter having a second input terminal and a second output terminal, wherein the second input terminal is configured to be electrically coupled to the first output terminals of the first inverter indirectly through a power storage device, and the second output terminal is configured to be electrically coupled to an electric power grid, wherein the second inverter comprises a second inverter controller communicably coupled to the first inverter controller and configured to:

receive, at the second inverter, at least the first portion of the total generated output electric power from the first inverter; and transmit, through the second inverter, the received first portion of the total generated output electric power to the electric power grid; and an electronic device communicably coupled to both the first inverter controller and the second inverter controller, wherein the electronic device is configured to:

display information related to transmission of electric power to the electric power grid; and transmit an instruction to the second inverter controller to regulate a quantity of the electric power to be transmitted to the electric power grid.

2. The electric power transmission system of claim 1, wherein the first inverter controller is configured to:

determine the total generated output electric power from the electric power generator; and determine the total required electric power based on the cumulative of respective electric power requirements of the one or more load elements.

3. The electric power transmission system of claim 1, wherein the second inverter is configured to be in an indirect electrical connection with the electric power generator via the first inverter.

4. The electric power transmission system of claim 1, wherein the second inverter has a lower electric power capacity than that of the first inverter.

5. The electric power transmission system of claim 1, wherein the second inverter controller is further configured to determine a cumulative output electric power transmitted from the second inverter to the electric power grid during a predetermined period of time.

6. The electric power transmission system of claim 1, further comprising the power storage device configured to be electrically coupled to a battery port of the first inverter, wherein the second input terminal of the second inverter is configured to be electrically coupled to the first output terminals of the first inverter further through the power storage device.

7. The electric power transmission system of claim 1, wherein the electric power diversion engine is configured to set a value for the minimum difference based on an input from the electronic device.

8. The electric power transmission system of claim 1, wherein the second inverter is a plug-in inverter.

9. A method for transmission of electric power, the method comprising:

determining, by an electric power diversion engine of a first inverter controller, a minimum difference between a total generated output electric power from an electric power generator and a total required electric power that is based on a cumulative of respective electric power requirements of one or more load elements;

diverting, by the electric power diversion engine, at least a first portion of the total generated output electric power from a first inverter, based on the minimum difference;

receiving, by a second inverter controller, at a second inverter, at least the first portion of the total generated output electric power from the first inverter, wherein, the first inverter has first input terminals and first output terminals, the first input terminals are electrically coupled to the electric power generator configured to generate an output electric power, and the first output terminals are electrically coupled to the one or more load elements, and the first inverter is configured to supply alternating current (AC) electric power to the one or more load elements, and wherein the second inverter has a second input terminal and a second output terminal, the second input terminal is electrically coupled to the first output terminals of the first inverter indirectly through a power storage device, and the second output terminal is electrically coupled to an electric power grid;

receiving, by the second inverter controller, an instruction from an electronic device to regulate a quantity of the electric power to be transmitted to the electric power grid; and transmitting, by the second inverter controller, through the second inverter, the first portion of the total generated output electric power to the electric power grid.

10. The method of claim 9, further comprising:

determining, by the first inverter controller, the total generated output electric power of the electric power generator, wherein the first inverter comprises the first inverter controller, and wherein the first inverter controller is communicably coupled to the electric power generator, the one or more load elements, and the second inverter controller; and determining, by the first inverter controller, the total required electric power based on the cumulative of respective electric power requirements of the one or more load elements.

11. The method of claim 9, further comprising:

providing the power storage device configured to be electrically coupled to a battery port of the first inverter; and electrically coupling the second input terminal of the second inverter to the first output terminals of the first inverter through the power storage device.

12. The method of claim 9, further comprising determining, by the second inverter controller, a cumulative output electric power transmitted from the second inverter to the electric power grid during a predetermined period of time.

13. The method of claim 9, further comprising indirectly electrically connecting the second inverter with the electric power generator via the first inverter.

14. A plug-in inverter configured to be electrically coupled to a first inverter of an electric power transmission system, wherein the first inverter has first input terminals and first output terminals, the first input terminals are electrically coupled to an electric power generator and the first output terminals are electrically coupled to one or more load elements, the first inverter configured to supply alternating current (AC) electric power to the one or more load elements, wherein the first inverter comprises a first inverter controller communicably coupled to the electric power generator and the one or more load elements, the first inverter controller comprising an electric power diversion engine configured to:

determine a minimum difference between a total generated output electric power from the electric power generator and a total required electric power that is based on a cumulative of respective electric power requirements of the one or more load elements; and divert, at least a first portion of the total generated output electric power, based on the minimum difference; and wherein the plug-in inverter has a second input terminal and a second output terminal, the second input terminal is electrically coupled to the first output terminals of the first inverter indirectly through a power storage device, and the second output terminal is electrically coupled to an electric power grid, wherein the plug-in inverter comprises a second inverter controller communicably coupled to the first inverter controller and configured to:

receive, at the plug-in inverter, at least the first portion of the total generated output electric power from the first inverter;

receive an instruction from an electronic device to regulate a quantity of electric power to be transmitted to the electric power grid; and transmit, through the plug-in inverter, the received first portion of the total generated output electric power to the electric power grid.

15. The method of claim 9, comprising setting, via the electric power diversion engine, a value for the minimum difference based on an input from the electronic device.

16. The plug-in inverter of claim 14, wherein the plug-in inverter is configured to be in an indirect electrical connection with the electric power generator via the first inverter.

17. The plug-in inverter of claim 14, wherein the plug-in inverter has a lower electric power capacity than that of the first inverter.

18. The plug-in inverter of claim 14, wherein the second inverter controller is further configured to determine a cumulative output electric power transmitted from the plug-in inverter to the electric power grid during a predetermined period of time.

19. The plug-in inverter of claim 14, wherein the electric power transmission system further comprises the power storage device configured to be electrically coupled to a battery port of the first inverter, wherein the second input terminal of the plug-in inverter is configured to be electrically coupled to the first output terminals of the first inverter further through the power storage device.

20. The plug-in inverter of claim 14, wherein the electric power diversion engine is configured to set a value for the minimum difference based on an input from the electronic device.

* * * * *